(12) United States Patent
Mehring

(10) Patent No.: US 9,175,564 B2
(45) Date of Patent: Nov. 3, 2015

(54) TANK SLOSHING ENERGY RECOVERY SYSTEM

(71) Applicant: Parker-Hannifin Corporation, Cleveland, OH (US)

(72) Inventor: Carsten Mehring, Irvine, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 222 days.

(21) Appl. No.: 13/705,355

(22) Filed: Dec. 5, 2012

(65) Prior Publication Data

US 2013/0142626 A1 Jun. 6, 2013

Related U.S. Application Data

(60) Provisional application No. 61/566,716, filed on Dec. 5, 2011.

(51) Int. Cl.
*B64D 37/04* (2006.01)
*B64D 37/02* (2006.01)
*F01D 5/02* (2006.01)
(Continued)

(52) U.S. Cl.
CPC *F01D 5/02* (2013.01); *B64D 37/06* (2013.01); *B64D 37/32* (2013.01); *F03B 13/00* (2013.01); *F05B 2220/602* (2013.01); *Y02B 10/50* (2013.01)

(58) Field of Classification Search
CPC ........ B64D 37/32; B64D 37/02; B64D 37/08; B64D 45/00; B64D 37/30; B64D 25/00; B64D 2045/009; B64D 47/00; Y02T 50/44; Y02T 50/12; Y02T 50/53
USPC ........... 244/135 R, 135 B; 220/4.14; 261/133
See application file for complete search history.

(56) References Cited

U.S. PATENT DOCUMENTS 4,168,718 A 9/1979 Frosch et al.
4,347,036 A 8/1982 Arnold
(Continued)

FOREIGN PATENT DOCUMENTS

EP 0 250 084 12/1987

OTHER PUBLICATIONS

A.E.P. Veldman et al., "The Numerical Simulation of Liquid Sloshing on Board Spacecraft," Journal of Computational Physics 224, 2007, pp. 82-99.

(Continued)

*Primary Examiner* — Tien Dinh
*Assistant Examiner* — George Andonyan
(74) *Attorney, Agent, or Firm* — Renner, Otto, Boisselle & Sklar, LLP

(57) ABSTRACT

A hydrodynamic energy recovery system for effecting mixing of gases within a headspace of a liquid-containment vessel containing a liquid enables mixing of the gases by converting energy of moving or sloshing liquid in a liquid-filled lower portion of the vessel into energy for moving the gases. The system includes (1) a hydro-driven actuator that is movably driven in response to the movement of the liquid in the vessel, (2) a mixing device driven by the actuator such that motion of the mixing device effects mixing of the gases contained in the headspace above the liquid, and (3) a motion converter for converting motion of the actuator into motion for driving the mixing device. The mixing device can be driven without the need to run electrical power within the vessel and without the transfer of motion through an external wall of the vessel.

17 Claims, 5 Drawing Sheets

(51) Int. Cl.
*F03B 13/00* (2006.01)
*B64D 37/06* (2006.01)
*B64D 37/32* (2006.01)

(56) References Cited

U.S. PATENT DOCUMENTS

| | | | |
|---|---|---|---|
| 4,743,278 A | | 5/1988 | Yeh |
| 4,817,890 A | * | 4/1989 | Coffinberry ............. 244/135 R |
| 4,976,398 A | | 12/1990 | Bruhn |
| 5,013,214 A | | 5/1991 | Kapich |
| 5,551,488 A | * | 9/1996 | Gram ............................ 141/18 |
| 6,006,518 A | | 12/1999 | Geary |
| 6,293,525 B1 | * | 9/2001 | Ginsburgh et al. ............. 261/77 |
| 6,440,317 B1 | * | 8/2002 | Koethe ............... B01D 17/0217 123/541 |
| 6,568,878 B2 | | 5/2003 | Woodall et al. |
| 7,827,791 B2 | | 11/2010 | Pierson et al. |
| D649,893 S | | 12/2011 | Beeke |
| 2007/0108348 A1 | * | 5/2007 | Peters ....................... 244/135 R |
| 2009/0155107 A1 | | 6/2009 | Martinez |
| 2010/0127500 A1 | * | 5/2010 | Yang ............................... 290/53 |
| 2011/0006532 A1 | | 1/2011 | Grey et al. |
| 2011/0127373 A1 | * | 6/2011 | Thomas et al. ................. 244/65 |
| 2011/0215580 A1 | * | 9/2011 | Lu et al. ........................ 290/53 |
| 2012/0090312 A1 | * | 4/2012 | Wilson et al. ................... 60/495 |
| 2013/0307274 A1 | * | 11/2013 | Sia ................................. 290/55 |

OTHER PUBLICATIONS

Jan P. B. Vreeburg, "Liquid Dynamics from Spacelab to Sloshsat," Microgravity Sci. Technol, 2009, pp. 21:11-20.
Kloos et al., "The bioSTREAMTM tidal current energy converter," Proceedings of the 8th European Wave and Tidal Energy Conference, Uppsala, Sweden, 2009, pp. 426-433.
"Research and Development of a 150kw Tidal Stream Generator," The Engineering Business Limited, 2002.
Barbaux, "The Future of 'Green' Aviation and Aerospace," Aviation and Environment, ICAS Nice 21.102010, EADS Corporate Technical Office, pp. 1-21.
Pasini et al., "Energy Conversion Engineering Conference and Exhibit, 2000. (IECEC) 35th Intersociety," pp. 546-553, vol. 1, 2000.

* cited by examiner

TANK SLOSHING ENERGY RECOVERY SYSTEM

RELATED APPLICATIONS

This application claims the benefit of U.S. Provisional Application No. 61/566,716 filed Dec. 5, 2011, which is hereby incorporated herein by reference.

FIELD OF INVENTION

The present invention relates generally to energy recovery systems, and more particularly to an apparatus and method characterized by a hydrodynamic energy recovery system for effecting movement of gases in the headspace of a liquid-containment vessel, such as an aircraft fuel tank.

BACKGROUND

A liquid-containment vessel of a vehicle, such as a fuel tank of an aircraft, watercraft, or land vehicle, typically includes a liquid-filled lower portion containing liquid, such as fuel or other fluid, and a gas-filled headspace, such as an ullage-space, above the liquid-filled lower portion. In the context of a fuel tank, the ullage-space is typically filled with fuel vapors in addition to other gases, such as nitrogen-enriched air, to reduce the risk of an explosion via fuel vapor ignition within the ullage-space. Proper mixing of gases in the ullage-space enables maintenance of necessary inerting properties of the gases and minimizes concentrations of fuel vapors in localized areas of the fuel tank that otherwise would increase the potential for an explosion.

Injecting nitrogen-enriched or other inerting gas through injection ports of the fuel tank typically only induces limited mixing of gases in the ullage-space. On the other hand, mixing enhancement via an electric fan in the headspace would introduce a potential ignition source, apart from the additional electric energy required to drive the fan.

SUMMARY OF INVENTION

The present invention provides a hydrodynamic energy recovery system for effecting mixing of gases within a headspace of a liquid-containment vessel containing a liquid. The hydrodynamic energy recovery system enables the mixing of the gases by converting energy of moving or sloshing liquid in a liquid-filled lower portion of the vessel into energy for moving the gases within the headspace, thus effecting mixing of the gases. The system includes (1) a hydro-driven actuator that is movably driven in response to the movement of the liquid in the vessel, (2) a mixing device driven by the hydro-driven actuator such that motion of the mixing device effects mixing of the gases contained in the headspace above the liquid, and (3) a motion converter for converting motion of the hydro-driven actuator into motion for driving the mixing device. As will be appreciated, the mixing device can be driven without the need to run electrical power within the vessel and without the transfer of motion or energy through an external wall of the vessel.

According to one aspect of the invention, the present invention provides a hydrodynamic energy recovery system for a liquid-containment vessel to effect movement of gases in a headspace above a liquid in the vessel. The system includes a hydro-driven actuator mountable with respect to the vessel so as to be movably driven in response to movement of liquid in the vessel, and a mixing device drivable by the hydro-driven actuator. The mixing device is mountable with respect to the vessel such that motion of the mixing device effects mixing of gases contained in the headspace above the liquid in the vessel.

The system may include a motion converter for converting motion of the hydro-driven actuator into motion for driving the mixing device. The motion converter is connectable between the hydro-driven actuator and the mixing device.

The motion converter may include a unidirectional gearbox for converting multidirectional motion of the hydro-driven actuator into unidirectional motion of the mixing device.

The hydro-driven actuator may include a liquid-engaging surface having a surface area and the mixing device may include a gas-engaging surface having a surface area. The surface area of the gas-engaging surface may be larger than the surface area of the liquid-engaging surface.

The hydro-driven actuator may include a blade having a liquid-engaging surface, and the blade may be substantially lunate, generally crescent-shaped.

The hydro-driven actuator may include a vane or a float, or both.

The mixing device may include an impeller rotatable about an axis.

The mixing device may include a blade having a gas-engaging surface.

According to another aspect of the invention, the present invention provides a vehicle that includes a body, a liquid-containment vessel mounted to the body, and a hydrodynamic energy recovery system. The system includes a hydro-driven actuator mountable with respect to the vessel so as to be movably driven in response to movement of liquid in the vessel, and a mixing device drivable by the hydro-driven actuator. The hydrodynamic energy recovery system is mounted with respect to the vessel in such a manner as to effect movement of gases in the headspace of the vessel in response to movement of liquid in the vessel.

According to a further aspect of the invention, the present invention provides a hydrodynamic energy recovery system, particularly for an aircraft fuel tank containing fuel in a liquid-filled portion during aircraft operation, to effect movement of gases in an ullage-space above the fuel contained in the aircraft fuel tank. The system includes a hydroturbine device mounted in fluid communication with fuel in the liquid-filled portion of the aircraft fuel tank. The hydroturbine device has an input portion that is movable in response to movement of fuel within the aircraft fuel tank during operation of the aircraft so as to generate a motion at an output portion of the hydroturbine device. The system further includes a mixer mounted in fluid communication with the ullage-space of the aircraft fuel tank. The mixer has an output portion that is movable for mechanical interaction with gases in the ullage-space above the fuel to effect mixing of the gases, and a drive train connected between the output portion of the hydroturbine device and an input portion of the mixer. The drive train converts motion at the output portion of the hydroturbine device into motion for driving the output portion of the mixer as the fuel moves in the aircraft fuel tank.

The hydroturbine device may include a fuel-engaging surface having a surface area and the mixer may include a gas-engaging surface having a surface area. The surface area of the gas-engaging surface may be larger than the surface area of the fuel-engaging surface.

The input portion of the hydroturbine device may include a blade having a fuel-engaging surface.

The output portion of the mixer may include a blade having a gas-engaging surface.

The drive train may include a unidirectional gearbox for converting multidirectional motion of the hydroturbine device into unidirectional motion of the mixer.

According to yet a further aspect of the invention, the invention provides an aircraft that includes a body, a fuel tank mounted to the body, and a hydrodynamic energy recovery system including a hydroturbine device mounted in fluid communication with fuel in the liquid-filled portion of the aircraft fuel tank. The hydroturbine device has an input portion that is movable in response to movement of fuel within the aircraft fuel tank during operation of the aircraft so as to generate a motion at an output portion of the hydroturbine device. The system further includes a mixer mounted in fluid communication with the ullage-space of the aircraft fuel tank. The mixer has an output portion that is movable for mechanical interaction with gases in the ullage-space above the fuel to effect mixing of the gases. The system also includes a drive train connected between the output portion of the hydroturbine device and an input portion of the mixer. The drive train converts motion at the output portion of the hydroturbine device into motion for driving the output portion of the mixer as the fuel moves in the aircraft fuel tank. The hydrodynamic energy recovery system is mounted with respect to the fuel tank for effecting movement of gases in the ullage-space of the fuel tank in response to fuel moving in the fuel tank.

The foregoing and other features of the invention are hereinafter described in greater detail with reference to the accompanying drawings.

DETAILED DESCRIPTION

The principles of the present invention have general application to energy recovery systems, and particular application to the concept of energy extraction from bulk liquid motion at a small scale, such as the energy extraction from the bulk motion of liquid sloshing, flowing, or otherwise moving in a liquid-containment vessel due to motion induced in the liquid. More particularly, the principles of the present invention have application to energy recovery systems of liquid-containment vessels of vehicles, such as aircraft fuel tanks, and thus will be described below chiefly in this context. It will of course be appreciated, and also understood, that the principles of the invention may be useful in other applications including, in particular, in other vehicles having liquid-containment vessels, such as watercraft, spacecraft, and land-vehicles.

Figure 1:
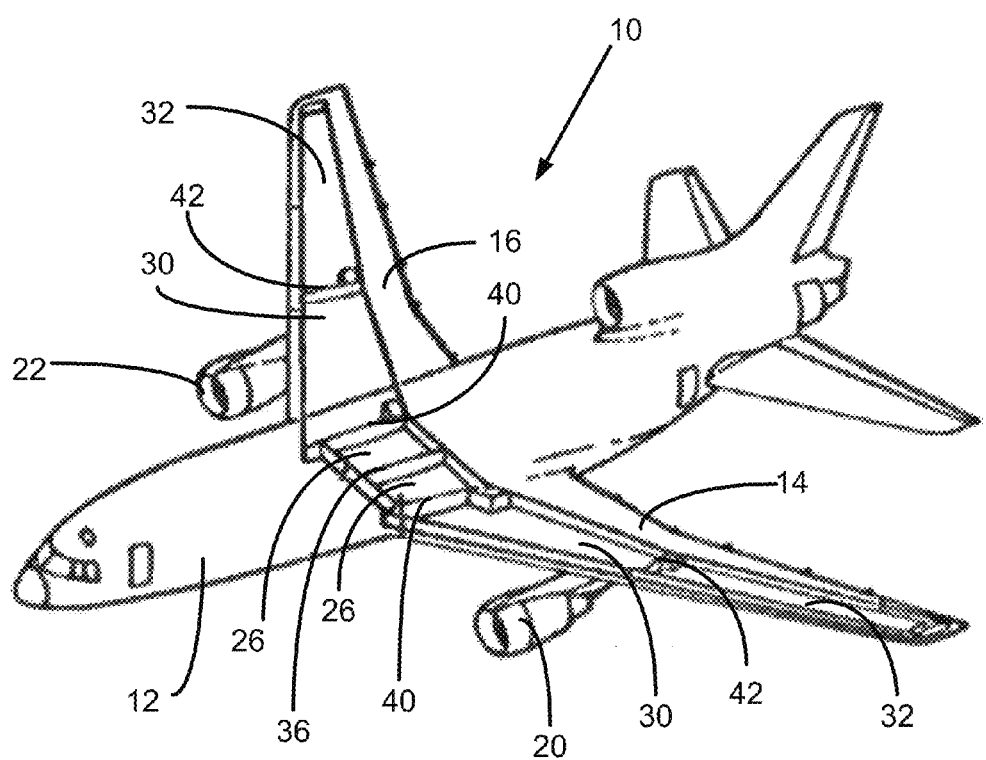
FIG. 1 is a perspective view of an aircraft that may employ a hydrodynamic energy recovery system according to the present invention.
Figure 2:
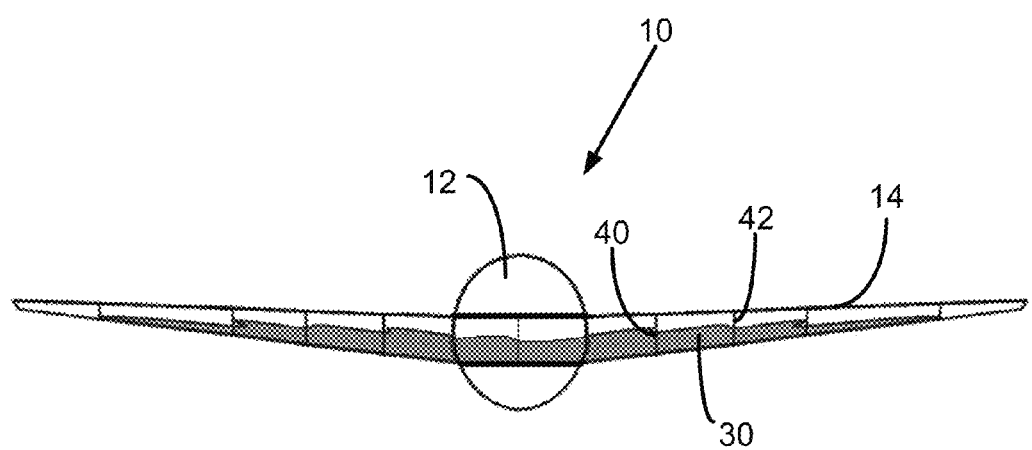
FIG. 2 is a partial cross-sectional view of the aircraft of FIG. 1, showing exemplary wing and fuselage fuel tanks.

Referring now in detail to the drawings and initially to FIGS. 1 and 2, a vehicle, specifically an aircraft 10, includes a body or fuselage 12; at least one wing mounted to the body 12, in this case two wings 14 and 16; and an engine 20 and 22 mounted to each wing 14 and 16. The aircraft 10, in the body 12 and/or the wings 14 and 16, includes a liquid-containment vessel suitable for containing a liquid, such as fuel in fuel tanks 26, 30, and 32. The tanks 26, 30, and 32 are fluidly connected to the engines 20 and 22 via fluid transfer vessels (not shown), such as tubes, hoses, and/or pipes, to provide fuel for power the engines 20 and 22. The aircraft 10 may include any number of fuel tanks, and in the illustrated embodiment the aircraft 10 has fuel tanks arranged across the width of the aircraft 10 in the body 12 and the wings 14 and 16. The fuel tanks are separated by walls, such as sidewalls 36, 40, and 42. It will be appreciated that the fuel tanks may be located in other suitable locations in or on the aircraft 10. Within each fuel tank 26, 30, and 32, for example, the liquid fuel is induced to move in response to movement of the aircraft 10. The present invention makes use of the movement of a liquid in a liquid-containment vessel, recapturing some of the energy of the moving liquid to mix the gas above the liquid without adding any additional energy to the vessel.

Figure 3:
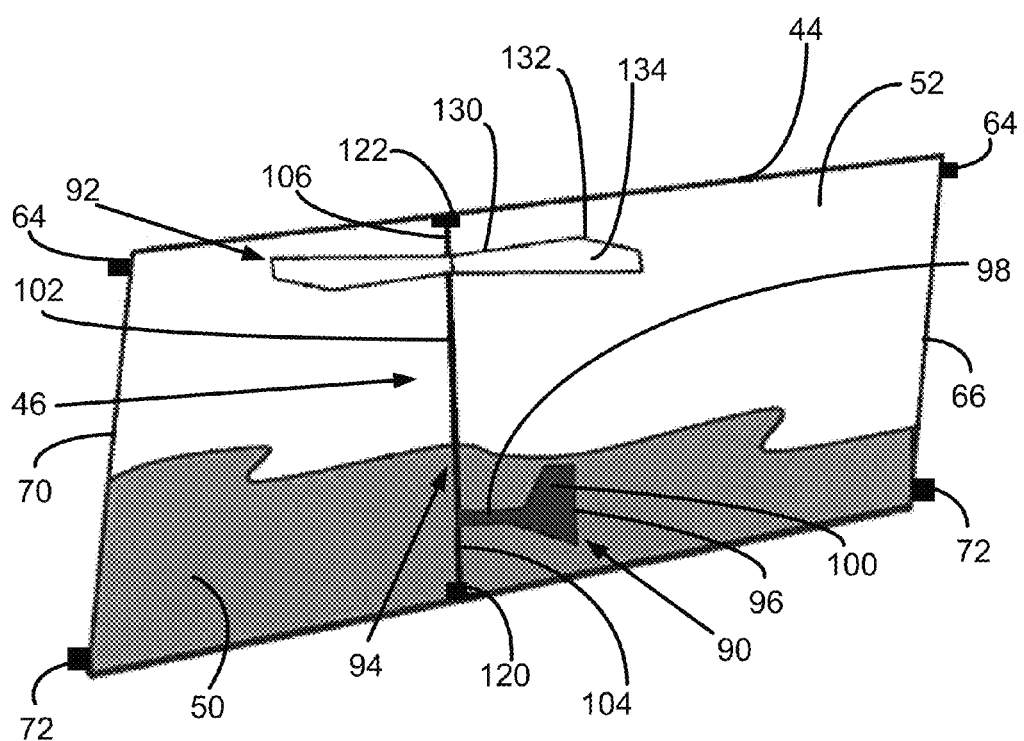
FIG. 3 is a fragmentary cross-sectional view of a fuel tank of the aircraft of FIG. 1, showing an exemplary hydrodynamic energy recovery system according to the present invention.

Turning now to FIG. 3, a liquid-containment vessel, or in this case a fuel tank 44, is shown in combination with a hydrodynamic energy recovery system 46. The energy recovery system 46 is mountable with respect to the fuel tank 44 and may be disposed partially or fully within the fuel tank 44. The fuel tank 44 may be mountable with respect to a vehicle, such as the aircraft 10 (FIG. 1), or it may be a standalone fuel tank. It will also be appreciated that in a vehicle, any number of fuel tanks or all of the fuel tanks may include an energy recovery system 46.

As shown, the fuel tank 44 contains a liquid, such as liquid fuel 50, in a liquid-filled lower portion of the fuel tank 44. The liquid may include another liquid other than fuel, and may be a solution, a suspension, an emulsion, or any other suitable liquid. The ullage-space, or headspace 52, above the liquid fuel 50 will typically contain gases, such as air, vapors, fumes, or any other gaseous substance. In the context of a fuel tank of an aircraft, such as the fuel tank 44, the liquid typically is liquid fuel 50 and the gases above the liquid fuel 50 in the headspace 52 typically include fuel vapors, in addition to ambient air or other gases.

The headspace 52 of a fuel tank of an aircraft often will be supplied with nitrogen-enriched air to reduce the oxygen concentration and thereby minimize the possibility of an explosion should a spark or other source of ignition come into contact with the fuel vapors within the headspace 52. Nitrogen-enriched air may be introduced into the fuel tank 44 via injection ports 64. The injection ports 64 are disposed in external walls of the fuel tank 44, such as sidewalls 66 and 70, and the ports 64 open to the interior of the fuel tank 44. Fuel 50 may be moved into and out of the fuel tank 44 through liquid ports 72, also disposed in external walls of the fuel tank 44. The fuel may be moved through the liquid ports 72 via pumping from pumps (now shown) or via other suitable means for moving fuel. Through these ports, multiple fuel tanks 44 may be in fluid communication, such as liquid communication or gaseous communication, via the liquid ports 72 and/or the injection ports 64.

Proper mixing of the gases in the headspace 52 facilitates maintaining necessary inerting properties of the gases in the ullage-space, and minimizes concentrations of fuel vapors in localized areas of the fuel tank 44 that otherwise would increase the potential for an explosion. Injecting nitrogen-enriched or other inerting gas through injection ports 64 of the fuel tank 44 typically only induces limited mixing of gases in the ullage-space. The hydrodynamic energy recovery system 46 provided by the invention improves mixing of the gases in the headspace 52, and can mix the gases in the ullage-space independent of when an inerting gas is being injected into the fuel tank 44.

In the context of an aircraft, such as the aircraft 10 (FIG. 1), the hydrodynamic energy recovery system 46 recovers energy from movement of the liquid fuel 50, such as sloshing, due to aircraft acceleration, deceleration, banking, change in elevation, or other motion or movement of the aircraft. Alternatively, the fuel 50 may move due to pumping of the fuel 50 in or out of the fuel tank 44 through the liquid ports 72. The energy of the moving fuel 50 may be considerable, particularly in the case of a long-range aircraft, where the fuel weight may make up approximately 45% of the overall aircraft weight.

The hydrodynamic energy recovery system 46 is a substantially mechanical system that converts the energy of the moving fuel 50 into energy to effect movement of the gases in the headspace 52 to ensure a more uniform distribution of the gases. Thus, the system 46 provides a cost-effective mechanism to mix the gases in the headspace 52 without additional energy expenditures or flight safety concerns that would arise due to presence of an electric system.

As can be appreciated, in the context of the aircraft 10, parts of the energy recovery system 46 may be made of materials, such as aluminum, that are compatible with the liquid fuel 50. Parts of the system 46 also may be made of spark-resistant materials, such as zinc-aluminum alloys, or other nonferrous materials, which may include less than 5% iron. In the instance that parts of the system 46 are instead made from ferrous materials, such parts may be mounted so as to not contact one another to prevent sparking and subsequent ignition of the fuel vapors and other gases in the headspace 52 above the liquid fuel 50.

The exemplary embodiment of the energy recovery system 46 shown in FIG. 3 includes a hydro-driven actuator 90 extending into the liquid fuel 50 for interacting with the fuel 50 in the fuel tank 44. The system 46 also includes a mixing device 92 in the headspace 52 that is drivable by the hydro-driven actuator 90 such that motion of the mixing device 92 moves the gases in the headspace 52, to effect mixing of the gases. A drive train 94 is connected between the hydro-driven actuator 90 and the mixing device 92 to transfer or transmit energy from the actuator 90 to the mixing device 92.

The hydro-driven actuator 90, such as a hydroturbine device, is mounted in fluid communication with fuel in the liquid-filled lower portion of the fuel tank 44 so as to be at least partially submerged or immersed in the fuel 50. The hydro-driven actuator 90 includes an input portion, such as a blade 96, and an output portion, such as a moment arm 98, connected to the input portion. The blade 96, in this case a vane, may be substantially lunate in shape, in other words generally crescent-shaped, or of any other suitable shape for interacting with the fuel 50. The blade 96 has at least one liquid-engaging surface, such as a fuel-engaging surface 100. Additionally, other embodiments of the input portion may include a rotor, a fan, a piston, a floating device, or other device suitable for moving in response to motion of the fuel 50. Movement of the fuel 50 in the fuel tank 44 will cause the fuel 50 to push against the blade 96 and thereby generate a motion at the output portion of the actuator 90. Specifically, such movement of the fuel 50 may cause the actuator 90 to rotate, pivot, oscillate, vibrate, or otherwise move and to transmit that energy to the drive train 94.

The drive train 94 includes a drive shaft 102, which may include a rod, screw, or other suitable structure. The drive train 94 can also include a mechanism for increasing or decreasing the magnitude of the motion, or of controlling the direction of motion of the drive shaft 102, such as through a ratcheting mechanism, for example. The drive shaft 102 extends between a first end 104, which is connected to the output portion of the hydro-driven actuator 90, in this case the moment arm 98, and a second end 106, connected to the mixing device 92. The drive train 94 is mounted to the fuel tank 44 at the first end 104 of the drive shaft 102 by a mounting apparatus, such as a lower bracket 120, and at the second end 106 of the drive shaft 102 by another mounting apparatus, such as an upper bracket 122, as shown. The upper bracket 122 and the lower bracket 120 may include bearings or bushings or other components to facilitate rotation of the drive shaft 102 relative to the fuel tank 44. It will be appreciated that the drive train 94 may be mounted to the fuel tank 44 at only one end of the drive shaft 102, and also that the drive train 94 may be mounted to any suitable wall of the fuel tank 44, although not specifically shown. Additionally, the drive train 94 may include other mechanisms, such as mechanical or hydraulic mechanisms, for transferring energy from the hydro-driven actuator 90 and the mixing device 92, including but not limited to gears, belts, shafts, pulleys, screws, and springs, for example. Nonetheless, the manner of mounting the drive train 94 to the fuel tank 44, and more generally the construction of the hydrodynamic energy recovery system 46, may be done in such manner as to maintain the robustness and sturdiness of the system 46 to transfer energy from the moving liquid to mix the gases above.

The mixing device 92 receives the energy from the drive train 94 and transfers or transmits that energy to the gas in the headspace 52. The mixing device 92, such as a mixer, fan, or other device suitable for moving gas, is mounted in fluid communication with gases in the headspace 52 so as to be at least partially located in the headspace 52. The mixing device 92 includes an input portion connected to the drive train 94, such as the illustrated moment arm 130, and an output portion or impeller, such as a blade 132, connected to the input portion. The blade 132 may be a fan blade and includes at least one gas-engaging surface 134. Further, the blade 132 may be angled with respect to the drive train 94 so as to effect movement of gas in a direction towards the fuel 50, or in any other suitable direction. Additionally, other embodiments of the output portion may include a rotor, floating device, piston, or other device suitable for moving gases in the headspace 52.

The mixing device 92 receives the energy from the drive train 94 via the moment arm 130, which is connected to the second end 106 of the drive shaft 102 of the drive train 94. Movement of the drive shaft 102 generates a motion at the input portion of the mixing device 92, which causes the blade 132 to push against the gases in the headspace 52, effecting mixing of the gases. Specifically, rotation, pivoting, oscillation, vibration, or other movement of the drive shaft 102 drives motion of the mixing device 92. The motion of the mixing device 92 can include rotation, pivoting, oscillation, vibration, or other movement, and is not necessarily the same as the movement of the hydro-drive actuator 90 or of the drive shaft 102.

Additionally, it will be appreciated that gases and liquids generally have differing densities, or in the context of the fuel tank 44, the headspace gases and the liquid fuel 50 have differing densities. Specifically, the liquid fuel 50 will be denser than the gases in the headspace 52. Thus, the surface area of the fuel-engaging surface 100 of the hydro-driven actuator 90 for interacting with the liquid fuel 50 may be smaller than a surface area of the gas-engaging surface 134 of the mixing device 92 for interacting with fuel vapors, inerting gases, and other gases, or vice versa.

As the liquid fuel moves, it pushes against the fuel-engaging surface 100 of the hydro-driven actuator 90. Motion of the hydro-driven actuator 90 is transferred to the drive shaft 102, causing the drive shaft 102 to rotate or otherwise move. Movement of the drive shaft 102 in turn generates motion at the input portion of the mixing device 92, also connected to the drive shaft 102. The hydro-driven actuator 90 thus converts the motion of the relatively-denser liquid fuel, which motion can be unpredictable in direction and magnitude, into a rotary motion of the blade 96 about the axis of the driveshaft 102, to which the actuator 90 is connected. The drive shaft 102 transmits that rotary motion from its first end 104, where the actuator 90 is connected, to its second end 106, where the output portion of the mixing device 92 is connected. The mixing device 92 converts the rotary motion of the drive shaft 102 into rotary motion of the blade 132 about the axis of the drive shaft 102. Motion of the mixing device 92, in turn causes subsequent motion of the relatively lower-density gases in the headspace 52, effecting mixing of the gases.

Figure 4:
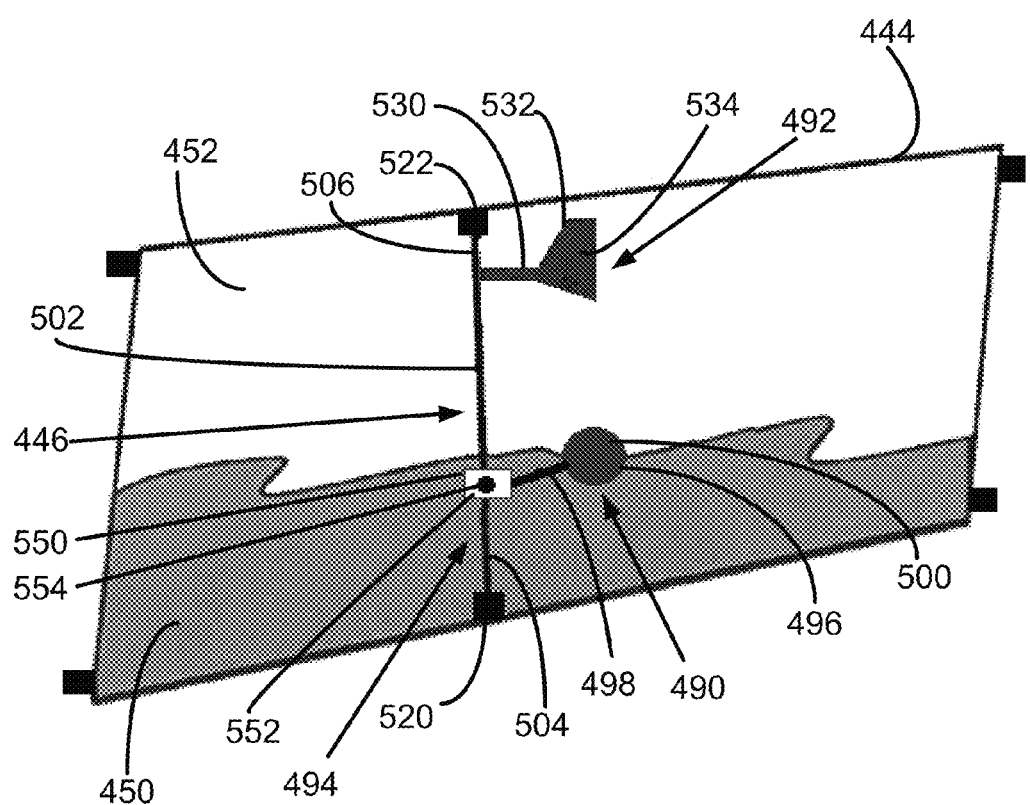
FIG. 4 is another fragmentary cross-sectional view of a fuel tank of the aircraft of FIG. 1, showing another exemplary hydrodynamic energy recovery system according to the present invention.

Turning now to FIG. 4, an exemplary embodiment of another fuel tank and hydrodynamic energy recovering system are shown at 444 and 446, respectively. The illustrated embodiment of FIG. 4 is substantially the same as the above-referenced embodiment of FIG. 3, and consequently the reference numerals generally refer to the same components but are indexed by 400 to denote structures corresponding to similar structures in the embodiment of FIG. 3. Thus the foregoing description of the fuel tank 44 and the system 46 of FIG. 3 are equally applicable to the fuel tank 444 and system 446 of FIG. 4, except as noted below. Moreover, it will be appreciated that aspects of the fuel tanks 44 and 444 and systems 46 and 446 may be substituted for one another or used in conjunction with one another where applicable.

In this embodiment, as in the previous embodiment, the system 446 includes a hydro-driven actuator 490 for interacting with the liquid fuel 450 in the fuel tank 444; a mixing device 492 that is drivable by the hydro-driven actuator 490; and a drive train 494 connected between the hydro-driven actuator 490 and the mixing device 492 to transfer energy from the actuator 490 to the mixing device 492.

The hydro-driven actuator 490 is mounted in fluid communication with the fuel 450 in the liquid-filled lower portion of the fuel tank 444. The actuator 490 includes an input portion, in this case a float 496, connected to an output portion, such as a moment arm 498. The float 496 may be a foam, a hollow apparatus, a balloon, a bladder, an inflatable device, or other suitable relatively low-density device for floating in a liquid, such as the liquid fuel 450. The float 496 also includes at least one liquid-engaging surface, such as a fuel-engaging surface 500. The moment arm 498 is connected to the drive train 494 as in the previous embodiment, except that the drive train 494 includes a motion converter 550 connected between the drive shaft 502 and the moment arm 498. The drive shaft 502 is mounted to the fuel tank 444 at a first end 504 by a mounting apparatus, such as a lower bracket 520, and at a second end 506 by another mounting apparatus, such as an upper bracket 522. It will be appreciated that the drive shaft 502 may alternatively be mounted to the fuel tank 444 at only one end, and also that the drive shaft 502 may be mounted to any suitable wall of the fuel tank 444, although not specifically shown.

The motion converter 550 of the drive train 494 includes a housing 552 mounted to the fuel tank 444 by a mounting apparatus, such as a lower bracket 554. It will be appreciated that the bracket 554 may be mounted to any suitable wall of the fuel tank 444 even though it is mounted to a lower wall in the illustrated embodiment. It will be further appreciated that the motion converter 550 may be mounted to the fuel tank 444 so as to support the energy recovery system 446 without mounting of the drive shaft 502 to the fuel tank 444, although not specifically shown.

The motion converter 550 includes a gearbox, or other apparatus for converting rotation, pivoting, oscillation, vibration, or other motion of the actuator 490 into motion of the mixing device 492. The gearbox motion converter 550 may contain interconnected gears (not shown) and other components suitable for converting mechanical motion. The gearbox may be a unidirectional gearbox for converting multidirectional movement, such as back and forth, up and down, or clockwise and counterclockwise movement, into a respective unidirectional movement, or vice versa. Alternatively, the gearbox may be a multidirectional gearbox for converting multidirectional movement into a respective multidirectional movement. It will be appreciated that the gear ratio of the gearbox may control the movement speed ratio of the hydro-driven actuator 490 and of the mixing device 492. Thus the drive train 94, via the gearbox, may amplify or reduce the motion of the mixing device 492 relative to the motion of the actuator 490.

The mixing device 492, mounted in fluid communication with gases in a headspace 452, receives energy from the drive train 494 and transfers that energy to the gases. As illustrated, an input portion of the mixing device 492, such as a moment arm 530, receives motion from the drive train 494 and transfers that motion to an output portion or impeller. The impeller may include a blade 532 connected to the output portion. The blade 532, in this case a vane, includes at least one gas-engaging surface 534.

Accordingly, motion of the hydro-driven actuator 490 is transferred to the drive shaft 502 via the motion converter 550, causing the drive shaft 502 to rotate or otherwise move. Movement of the drive shaft 502 in turn generates motion at the input portion of the mixing device 492, also connected to the drive shaft 502. Motion of the mixing device 492 causes subsequent motion of the gases in the headspace 452, thus effecting mixing of the gases.

Figure 5:
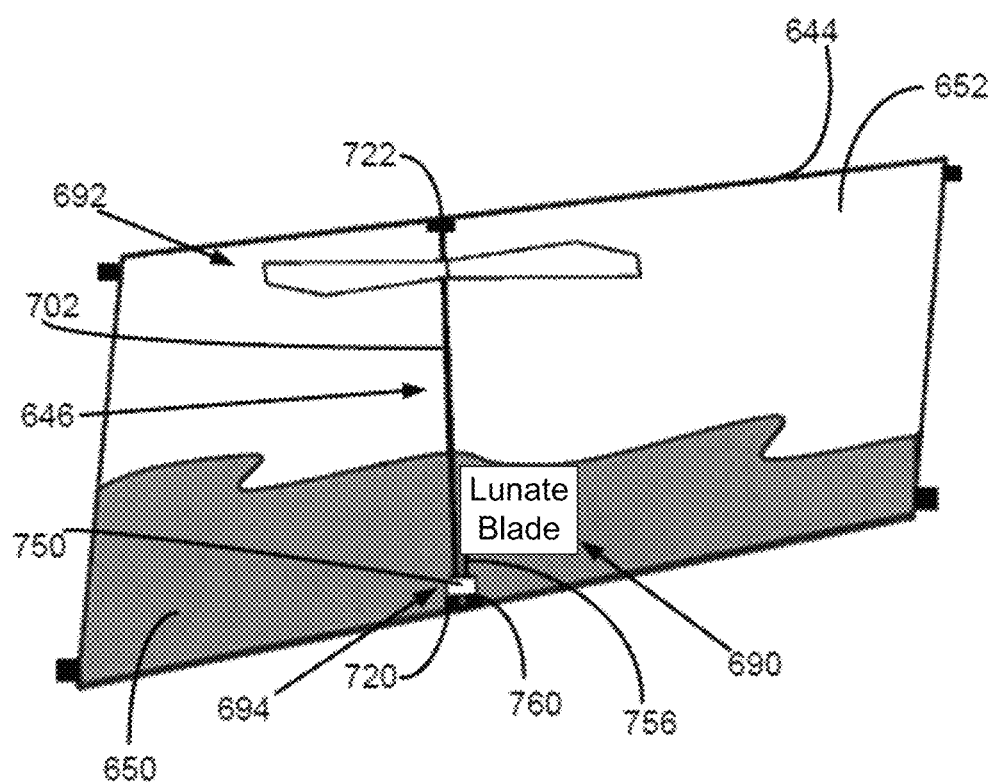
FIG. 5 is a further fragmentary cross-sectional view of a fuel tank of the aircraft of FIG. 1, showing a further exemplary hydrodynamic energy recovery system according to the present invention.

Turning now to FIG. 5, another exemplary embodiment of a fuel tank and a hydrodynamic energy recovery system are shown at 644 and 646, respectively. The embodiment of FIG. 5 is substantially the same as the above-referenced embodiments of FIGS. 3 and 4, and consequently the same reference numerals are used to identify corresponding elements, but the reference numerals are indexed by 600 with respect to FIG. 3 and by 200 with respect to FIG. 4 to denote structures in the embodiment of FIG. 5. In addition, the foregoing description of the fuel tanks and systems of FIGS. 3 and 4 are equally applicable to the fuel tank 644 and system 646 of FIG. 5, except as noted below. Moreover, it will be appreciated that aspects of the fuel tanks and systems of FIGS. 3, 4, and 5 may be substituted for one another or used in conjunction with one another where applicable.

Specifically, the energy recovery system 646 of FIG. 5 is substantially similar to the energy recovery system 46 of FIG. 3, with exception of a drive train 694 of FIG. 5 being substantially different than the drive train 94 of FIG. 3. The drive train 694 includes a first drive shaft 702, connected to a mixing device 692, and a second drive shaft 756, connected to a hydro-driven actuator 690. The first drive shaft 702 is mounted to the fuel tank 644 via mounting apparatuses, such as a lower bracket 720 and an upper bracket 722, and the second drive shaft 756 is mounted to the fuel tank 644 via a mounting apparatus, such as a lower bracket 760. The first and second drive shafts 702 and 756 are also mounted substantially parallel to one another, and are connected by a motion converter 750. It will be appreciated that the first and second drive shafts 702 and 756 may instead be mounted substantially orthogonal or transverse to one another, or as otherwise suitable for connecting to the motion converter 750.

Accordingly, motion of the hydro-driven actuator 790, from interaction with a liquid fuel 650, is transferred to the drive train 694 through the second drive shaft 756 and the motion converter 750. The motion converter 750, like the motion converter 550 described above, may include a gear train for increasing or reducing the speed and magnitude of the motion transferred from the actuator 790 to the mixing device 692. The mixing device 692 is connected to the motion converter 750 via the first drive shaft 702. Motion of the mixing device 692 causes subsequent motion of the gases in a headspace 652 of the fuel tank 644 above the fuel 650, thereby effecting mixing of the gases.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, parts, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hydrodynamic energy recovery system for an aircraft fuel tank containing fuel in a liquid-filled portion during aircraft operation to effect movement of gases in an ullage-space above the fuel contained in the aircraft fuel tank, the system comprising:
a hydroturbine device mounted in fluid communication with fuel in the liquid-filled portion of the aircraft fuel tank and having an input portion of the hydroturbine device movable by a movement force of moving fuel within the aircraft fuel tank during operation of the aircraft, wherein movement of the input portion effects movement of an output portion of the hydroturbine device;
a mixer mounted in fluid communication with the ullage-space of the aircraft fuel tank, the mixer having an output portion that is movable for mechanical interaction with gases in the ullage-space above the fuel to effect mixing of the gases; and
a drive train connected between the output portion of the hydroturbine device and an input portion of the mixer, the drive train converting movement of the output portion of the hydroturbine device into movement for driving the output portion of the mixer as the fuel moves in the aircraft fuel tank.

2. The system according to claim 1, wherein the hydroturbine device includes a fuel-engaging surface having a surface area and the mixer includes a gas-engaging surface having a surface area, and wherein the surface area of the gas-engaging surface is larger than the surface area of the fuel-engaging surface.

3. The system according to claim 1, wherein the input portion of the hydroturbine device includes a blade having a fuel-engaging surface.

4. The system according to claim 1, wherein the output portion of the mixer includes a blade having a gas-engaging surface.

5. The system according to claim 1, wherein the drive train includes a unidirectional gearbox for converting multidirectional motion of the hydroturbine device into unidirectional motion of the mixer.

6. An aircraft comprising:
a body; and
the hydrodynamic energy recovery system according to claim 1, wherein the fuel tank is mounted to the body.

7. A hydrodynamic energy recovery system for a liquid-containment vessel to effect movement of gases in a headspace above a liquid in the vessel, the system comprising:
a hydro-driven actuator mountable with respect to the vessel so as to be movably driven by a movement force of moving liquid fuel in the vessel;
a mixing device drivable by the hydro-driven actuator, the mixing device being mountable with respect to the vessel, at least partially in a ullage-space of the vessel above the fuel, such that motion of the mixing device effects mixing of gases contained in the headspace above the liquid in the vessel; and
a motion converter for converting motion of the hydro-driven actuator into motion for driving the mixing device, and wherein the motion converter is connectable between the hydro-driven actuator and the mixing device.

8. The system according to claim 7, wherein the motion converter includes a unidirectional gearbox for converting multidirectional motion of the hydro-driven actuator into unidirectional motion of the mixing device.

9. The system according to claim 7, wherein the hydro-driven actuator includes a liquid-engaging surface having a surface area and the mixing device includes a gas-engaging surface having a surface area, and wherein the surface area of the gas-engaging surface is larger than the surface area of the liquid-engaging surface.

10. The system according to claim 7, wherein the hydro-driven actuator includes a blade having a liquid-engaging surface.

11. The system according to claim 7, wherein the hydro-driven actuator includes a vane or a float, or both.

12. The system according to claim 7, wherein the mixing device includes an impeller rotatable about an axis.

13. The system according to claim 7, wherein the mixing device includes a blade having a gas-engaging surface.

14. The system according to claim 7, in combination with a liquid-containment vessel, the hydrodynamic energy recovery system being mounted with respect to the vessel.

15. A vehicle comprising:
a body;
a liquid-containment vessel mounted to the body; and
a hydrodynamic energy recovery system according to claim 7;
wherein the hydrodynamic energy recovery system is mounted with respect to the vessel in such a manner as to effect movement of gases in the headspace of the vessel in response to movement of liquid in the vessel.

16. The system according to claim 10, wherein the blade is substantially lunate.

17. A method of mixing gases in an ullage-space above fuel contained in a fuel tank, the method comprising the steps of:
- moving a hydroturbine device by a movement force of the fuel moving within the fuel tank;
- mixing gases in the ullage-space of the fuel tank via motion of a mixer located in the ullage-space; and
- converting motion of the hydroturbine device into motion for driving the mixer wherein motion of the hydroturbine device is converted into motion of the mixer via a motion converter connected between the hydroturbine device and the mixer.

\* \* \* \* \*